United States Patent
Murakami

(10) Patent No.: US 10,057,524 B2
(45) Date of Patent: Aug. 21, 2018

(54) IMAGE CAPTURING APPARATUS

(71) Applicant: CANON KABUSHIKI KAISHA, Tokyo (JP)

(72) Inventor: Naotaka Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/807,694

(22) Filed: Nov. 9, 2017

(65) Prior Publication Data
US 2018/0139404 A1 May 17, 2018

(30) Foreign Application Priority Data

Nov. 15, 2016 (JP) ................................. 2016-222666

(51) Int. Cl.
H04N 5/335 (2011.01)
H04N 5/376 (2011.01)
H04N 5/372 (2011.01)
H04N 5/3745 (2011.01)
H04N 5/05 (2006.01)

(52) U.S. Cl.
CPC ............ *H04N 5/3765* (2013.01); *H04N 5/05* (2013.01); *H04N 5/372* (2013.01); *H04N 5/37455* (2013.01)

(58) Field of Classification Search
CPC ......................... H04N 5/372; H04N 5/37455
USPC ........................................................ 348/308
See application file for complete search history.

(56) References Cited

U.S. PATENT DOCUMENTS

| 4,197,584 A * | 4/1980 | Blazek | G07D 7/12 |
| | | | 250/556 |
| 6,163,327 A * | 12/2000 | Mori | H04N 1/506 |
| | | | 347/115 |
| 2009/0279081 A1* | 11/2009 | Urano | G01N 21/9501 |
| | | | 356/237.5 |
| 2010/0309173 A1* | 12/2010 | Matsuda | G09G 3/3674 |
| | | | 345/204 |
| 2011/0025867 A1* | 2/2011 | Kwan | G06K 7/10851 |
| | | | 348/222.1 |
| 2016/0210921 A1* | 7/2016 | Hur | G09G 3/003 |

FOREIGN PATENT DOCUMENTS

JP 2009-267969 A 11/2009

* cited by examiner

Primary Examiner — Usman Khan
(74) Attorney, Agent, or Firm — Cowan, Liebowitz & Latman, P.C.

(57) ABSTRACT

In an image capturing apparatus, a first output unit outputs a plurality of sets of first data obtained by adding a synchronization code to a pixel signal. A second output unit outputs a plurality of sets of second data obtained by adding the synchronization code to the pixel signal. A first correction unit corrects a shift in timing between the plurality of sets of first data output from the first output unit. A second correction unit corrects a shift in timing between the plurality of sets of second data output from the second output unit. A third correction unit corrects a shift in timing between the plurality of sets of first data that have been corrected by the first correction unit and the plurality of sets of second data that have been corrected by the second correction unit, based on the synchronization code.

11 Claims, 12 Drawing Sheets

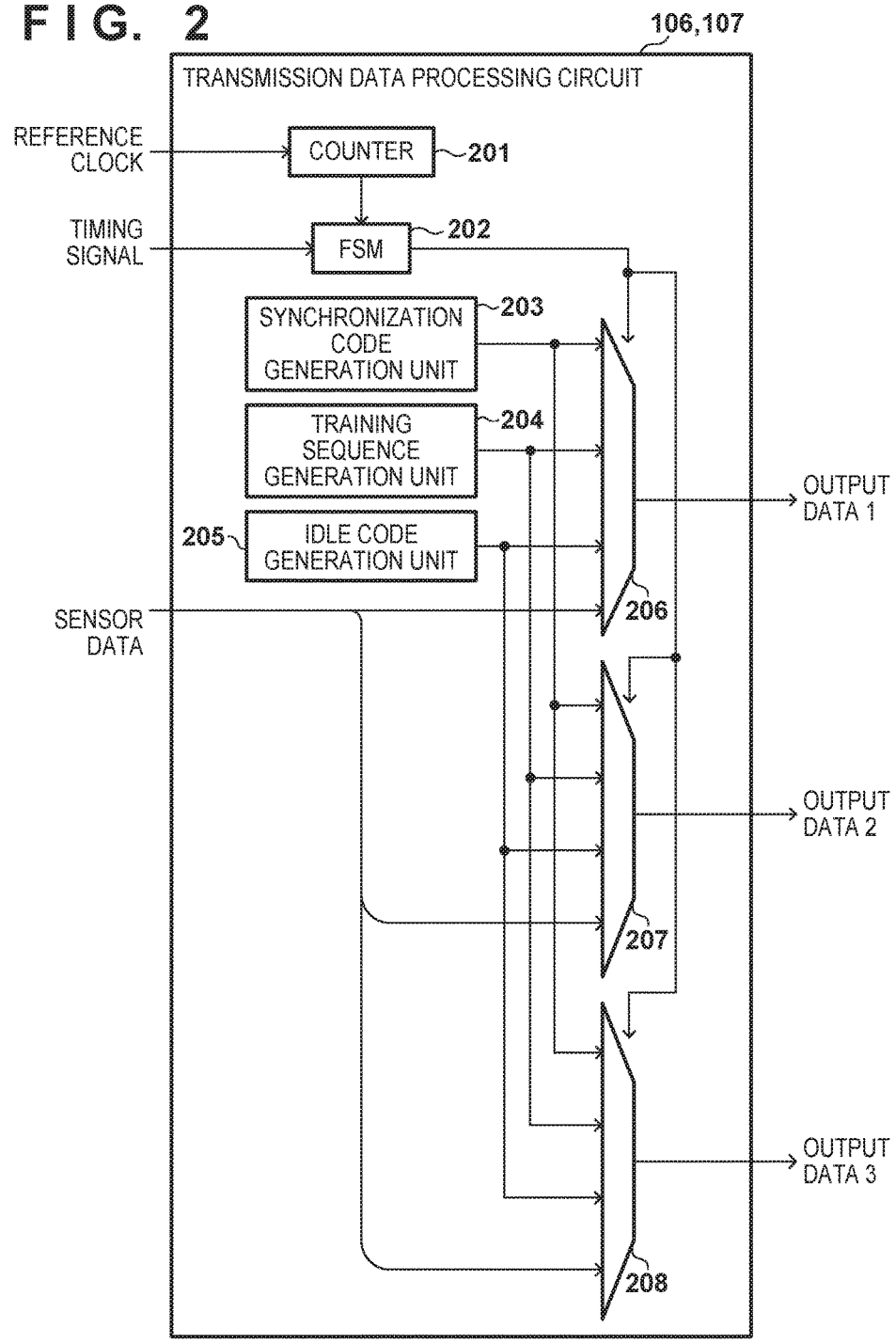

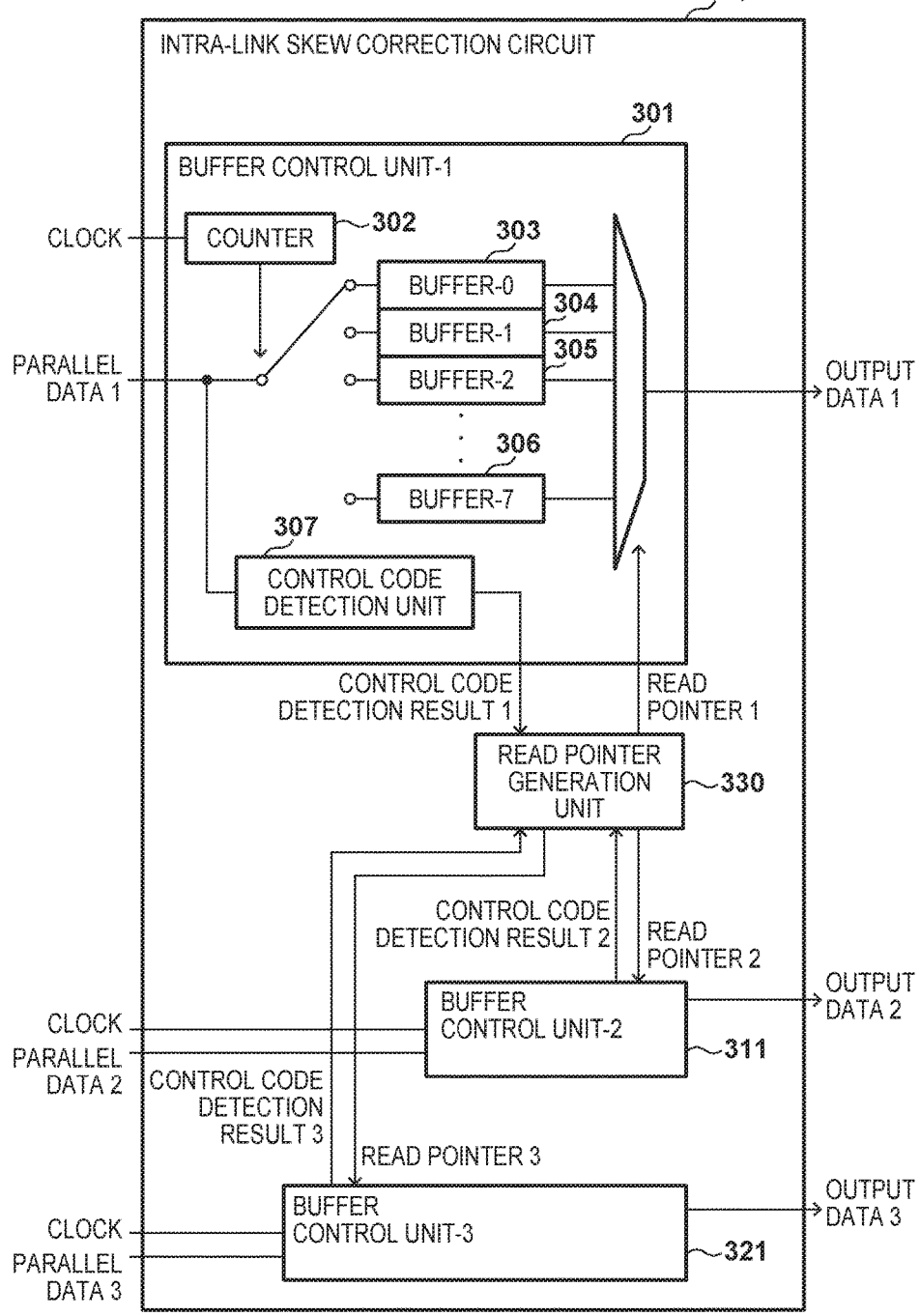

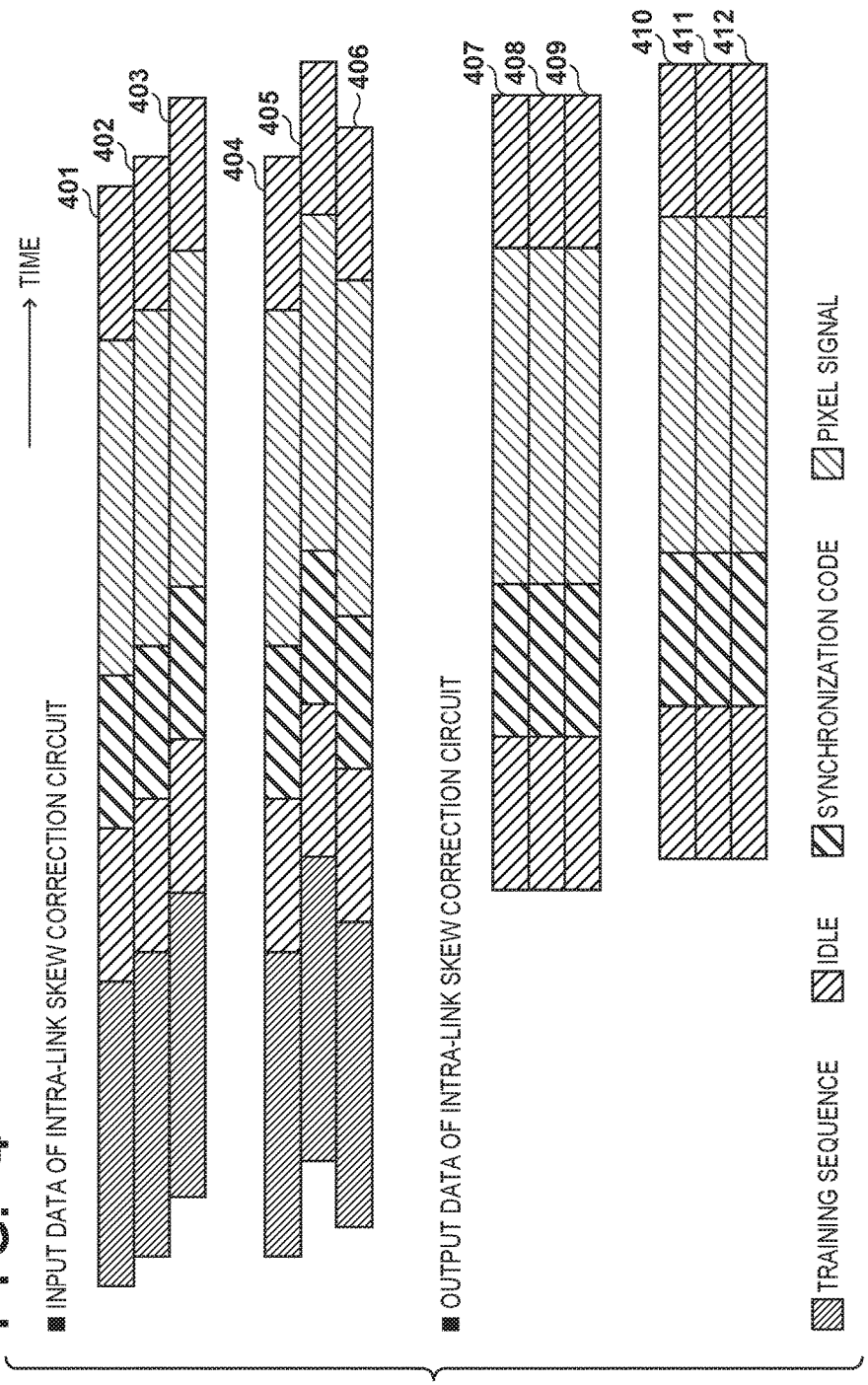

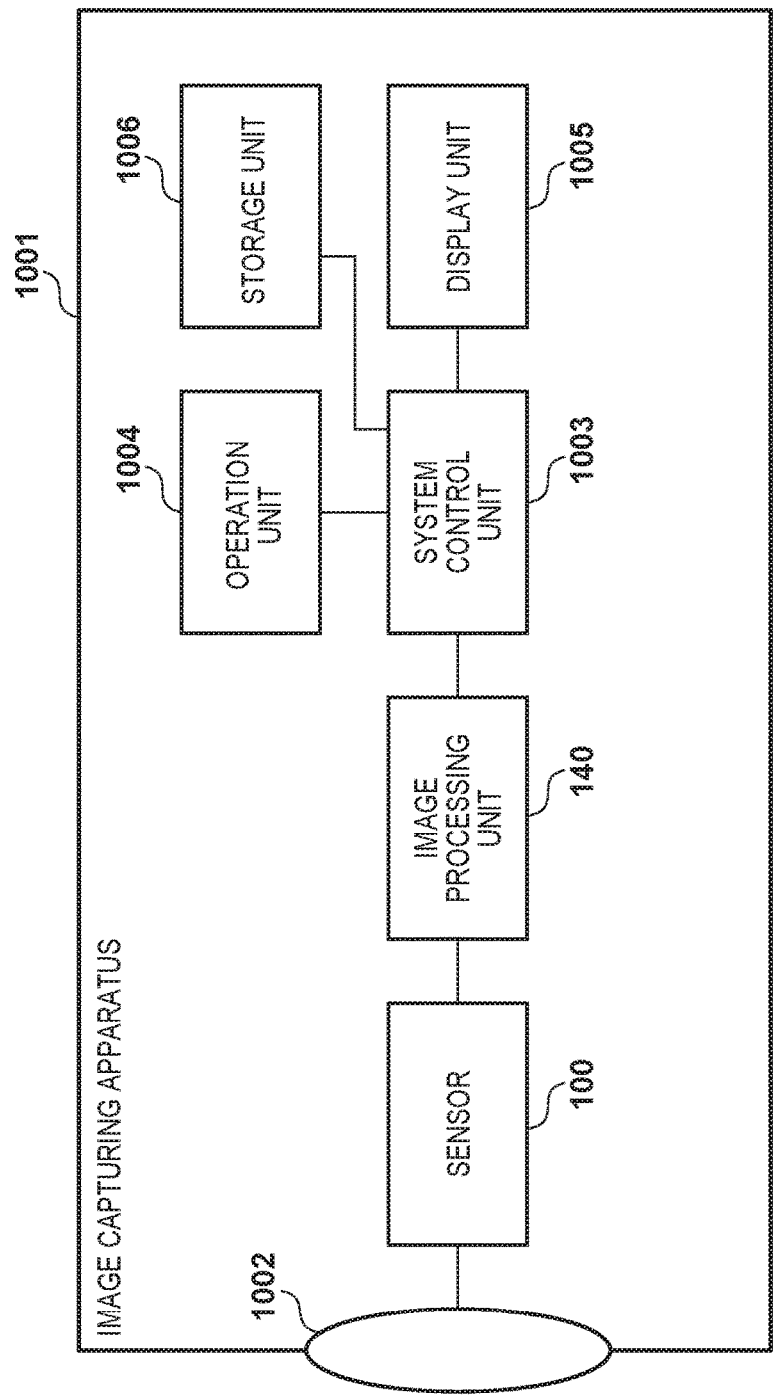

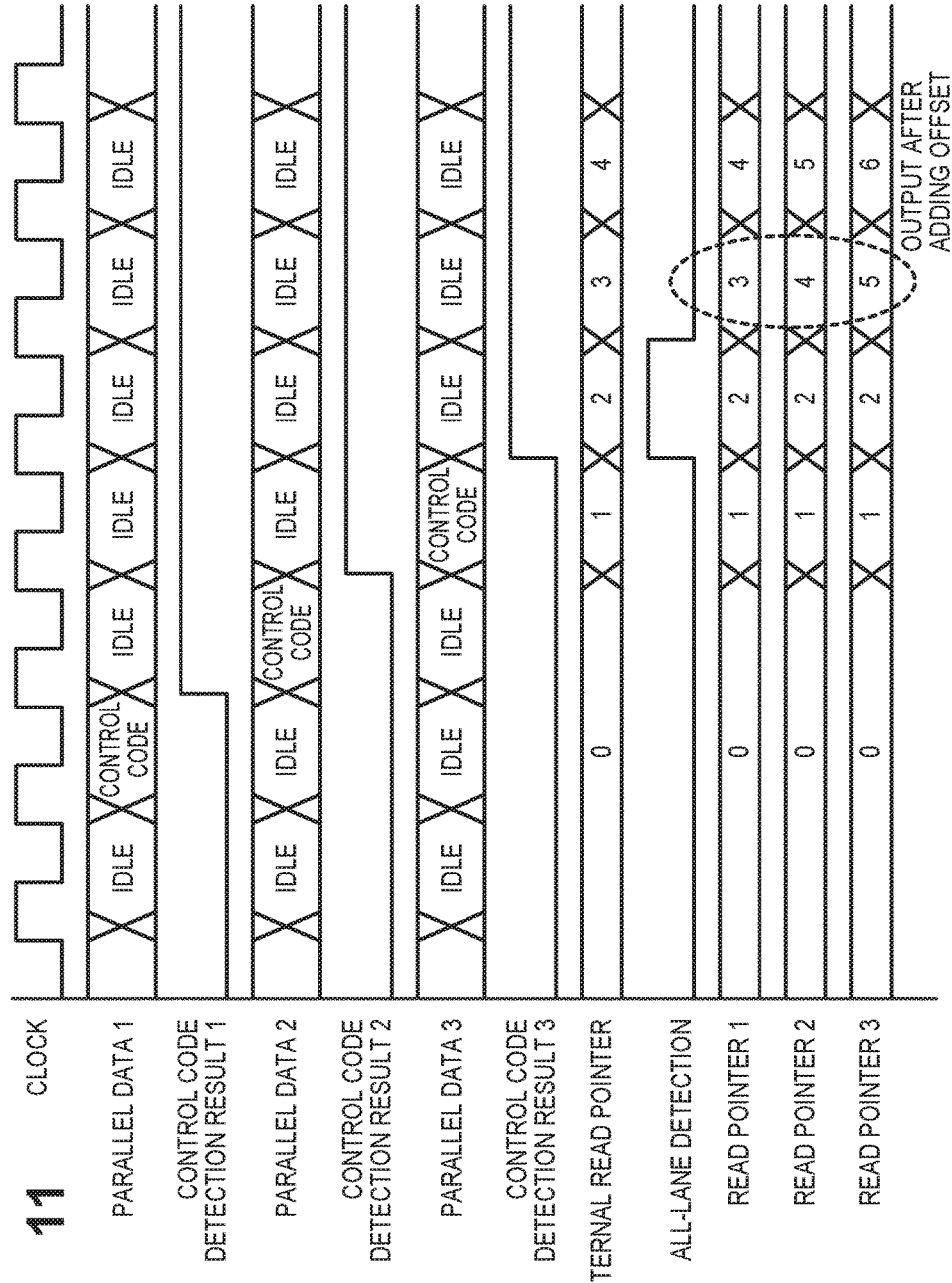

IMAGE CAPTURING APPARATUS

BACKGROUND OF THE INVENTION

Field of the Invention

The present invention relates to an image capturing apparatus.

Description of the Related Art

Due to a recent increase in image quality and frame rate in image sensors, there is a need for high-speed readout of pixel data from image sensors. Image sensors that are able to output analog data via a plurality of paths in parallel are used as image sensors from which pixel data can be thus read out at high speed.

Meanwhile, as a method of transferring digital data obtained by performing analog/digital conversion (A/D conversion) on this analog data, a method of converting the data to a serial form through parallel/serial conversion (P/S conversion) to transfer data at high speed is known. It is conceivable to employ this data transfer method to perform A/D conversion on analog data on each path that is output from the aforementioned image sensor, perform P/S conversion on digital data on each path, and transfer serial data via each path. In this case, serial data on a plurality of paths is transmitted in parallel, and accordingly the serial data on these paths needs to be synchronized.

Japanese Patent Laid-Open. No. 2009-267969 is known as a technique related to the synchronization of data that is transmitted via a plurality of paths in parallel. According to Japanese Patent Laid-Open No. 2009-267969, a transmission side adds a synchronization code to parallel data on respective paths, and transfers the serial data that is output from a plurality of P/S converters, which are individually provided corresponding to the parallel data on the respective paths. Since the plurality of P/S converters operate using serial clocks that are generated by different PLL circuits, the serial clocks have the same frequency but are not in a synchronous relationship, and the serial data on these paths is not in a synchronous relationship. A receiving side detects the synchronization code, converts the serial data on the respective paths to parallel data using corresponding serial-parallel converters (S/P converters), and adjusts the synchronization of the parallel data on the plurality of paths based on the synchronization code.

Japanese Patent Laid-Open No. 2009-267969 only discloses a configuration in which one of the plurality of P/S converters corresponds to each PLL circuit, and does not give consideration to a configuration in which two or more P/S converters correspond to each PLL circuit. Even if two or more P/S converters use a serial clock that is generated by the same PLL circuit, there may be cases where the synchronous relationship is canceled depending on the timing of releasing reset of each P/S converter, but Japanese Patent Laid-Open No. 2009-267969 does not give consideration to such cases. That is to say, Japanese Patent Laid-Open No. 2009-267969 is not intended to address the synchronization problem that occurs due to two causes, namely a configuration in which a plurality of PLL circuits are used, and a configuration in which two or more P/S converters use one PLL circuit.

SUMMARY OF THE INVENTION

According to an aspect of the present invention, there is provided an image capturing apparatus comprising: a sensor comprising: a pixel unit configured to be driven based on a reference timing signal, and output a pixel signal; a first output unit configured to output, via a plurality of transmission paths in accordance with a first timing signal that is associated with the reference timing signal, a plurality of sets of first data obtained by adding, synchronously with the first timing signal, a synchronization code to the pixel signal output from the pixel unit; and a second output unit configured to output, via a plurality of transmission paths in accordance with a second timing signal that is associated with the reference timing signal, a plurality of sets of second data obtained by adding, synchronously with the second timing signal, the synchronization code to the pixel signal output from the pixel unit; and an image processing unit comprising: a first correction unit configured to correct a shift in timing between the plurality of sets of first data output from the first output unit; a second correction unit configured to correct a shift in timing between the plurality of sets of second data output from the second output unit; and a third correction unit configured to correct a shift in timing between the plurality of sets of first data that have been corrected by the first correction unit and the plurality of sets of second data that have been corrected by the second correction unit, based on the synchronization code.

Further features of the present invention will become apparent from the following description of exemplary embodiments with reference to the attached drawings.

BRIEF DESCRIPTION OF THE DRAWINGS

FIG. 2 is a block diagram showing a configuration of transmission data processing circuits 106 and 107.

FIG. 3 is a block diagram showing a configuration of intra-link skew correction circuits 135 and 136.

FIG. 4 is a conceptual diagram depicting input and output of the intra-link skew correction circuits 135 and 136.

FIG. 10 is a block diagram showing a configuration of an image capturing apparatus 1001.

FIG. 11 shows an example of operations of the intra-link skew correction circuits 135 and 136.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

FIG. 10 is a block diagram showing a configuration of an image capturing apparatus 1001 according to a first embodiment. An image capturing optical system 1002 includes a lens, and forms an image to be captured on a sensor 100. The sensor 100 generates image data. The sensor 100 includes a pixel unit and peripheral circuits as will be described later, and these circuits constitute one integrated circuit chip. An image processing unit 140 performs image processing, compression processing, and the like on image data. An operation unit 1004 is an operation unit with which a user instructs the image capturing apparatus 1001 to perform an image capturing operation, an operation to change the angle of view to display a reproduced image, and so on. A display unit 1005 performs display to reproduce a live view image or a captured image, and displays a menu for setting or checking camera operation parameters, for example. A storage unit 1006 stores a captured image that has been processed by the image processing unit 140. A system control unit 1003 controls the entire image capturing apparatus 1001 by controlling each unit in the image capturing apparatus 1001. The image processing unit 140 and the system control unit 1003 may also be configured as one integrated circuit chip.

Next, the details of the sensor 100 and the image processing unit 140 will be described with reference to FIGS. 1A and 1B. Note that FIGS. 1A and 1B omit constituent elements that are not necessary for the description of this embodiment.

Figure 1A:
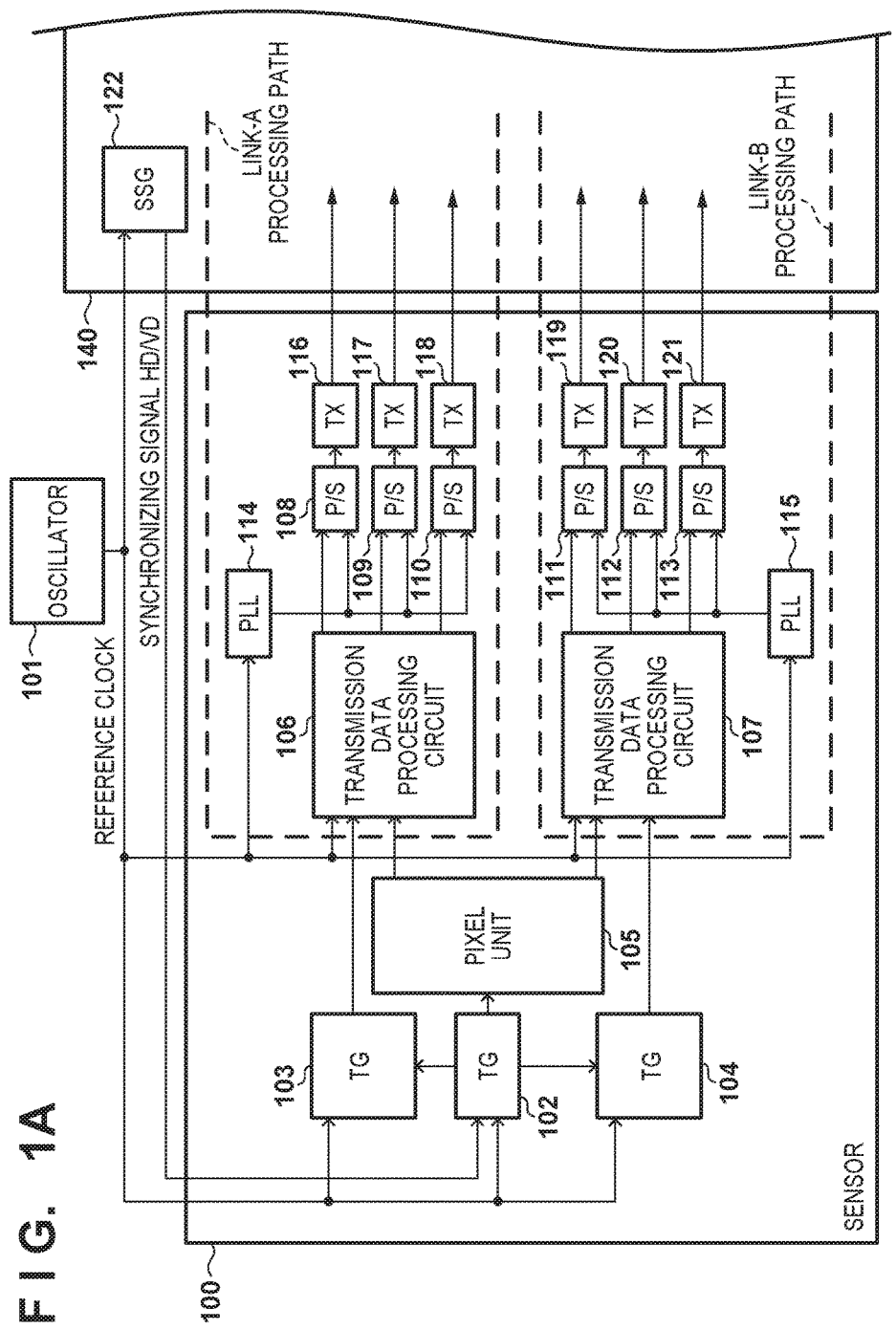
FIG. 1A is a block diagram showing a configuration of a sensor 100.
Figure 1B:
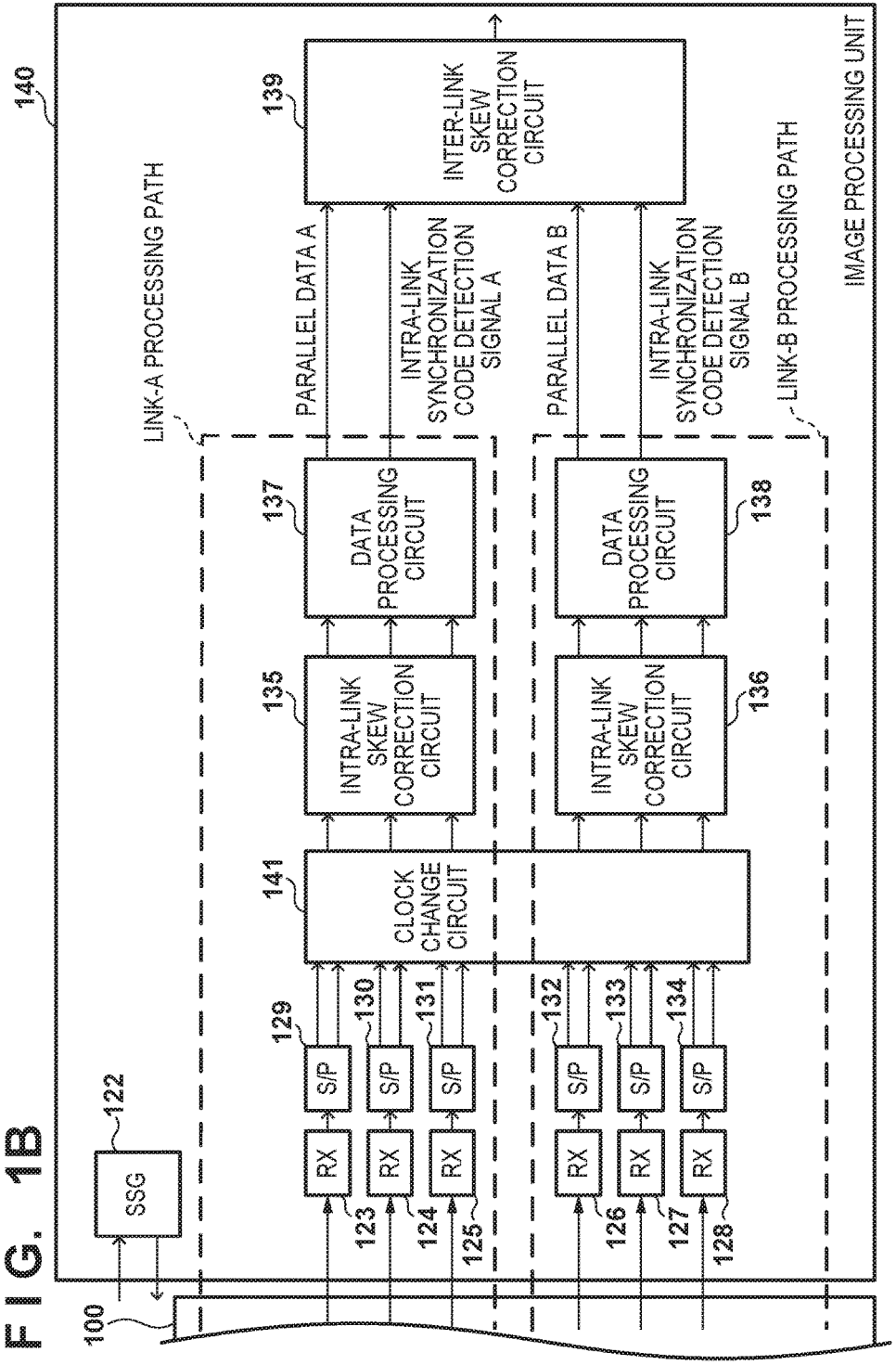
FIG. 1B is a block diagram showing a configuration of an image processing unit 140.

In FIG. 1A, an oscillator 101 outputs a reference clock, based on which operations are performed, to the sensor 100 and the image processing unit 140. Each of the later-described units operates based on the reference clock output by this oscillator 101. An SSG 122 (synchronizing signal generator) outputs a horizontal synchronizing signal HD and a vertical synchronizing signal VD synchronously with the reference clock. A TG 102 (timing signal generator) generates a drive pulse signal (first timing signal) for driving the sensor 100, based on the synchronizing signals HD/VD that are supplied from the SSG 122. Although an example of supplying the synchronizing signals HD/VD from the SSG 122 to the TG 102 is described here, only the vertical synchronizing signal VD may also be supplied from the SSG 122 to the TG 102. In this case, the TG 102 generates the drive pulse signal (first timing signal) by generating the horizontal synchronizing signal HD based on a predetermined period, starting from the timing at which the vertical synchronizing signal VD is supplied.

A pixel unit 105 is a pixel unit in an image sensor, which is constituted by a CCD or a CMOS, for example. This pixel unit 105 includes a photodetector element that performs photoelectric conversion, such as a photodiode, and a transfer path for sequentially outputting a pixel signal, which is obtained by this photodetector element, in accordance with the drive pulse signal (drive signal) supplied from the TG 102. The pixel unit 105 also includes an amplifier for amplifying the pixel signal, an A/D converter for converting the pixel signal to a digital signal, and so on. The pixel unit 105 outputs the data of each pixel as n-bit (n is an integer that is 2 or greater) digital data per pixel (sample).

Although FIG. 1A shows an example in which the pixel unit 105 outputs pixel signals to two processing paths, the number of processing paths is not limited to two. TGs 103 and 104 for driving the respective processing paths are provided. The TGs 103 and 104 generate timing signals (second timing signal) for driving the respective processing paths based on the reference clock and the synchronizing signals HD/VD that are distributed from the TG 102. Accordingly, the timing signals generated by the TGs 103 and 104 are associated with the drive pulse signal generated by the TG 102. Since the TGs 103 and 104 are arranged at positions that are suitable for appropriately driving the respective processing paths, and the interconnect distance for the signal from the TG 102 is different, the TGs 103 and 104 operate asynchronously. Note that, in the case of a configuration in which only the vertical synchronizing signal VD is supplied from the SSG 122 to the TG 102 as mentioned above, the horizontal synchronizing signal HD distributed from the TG 102 to the TGs 103 and 104 is the horizontal synchronizing signal HD generated by the TG 102.

Transmission data processing circuits 106 and 107 generate transmission data conforming to a predetermined protocol based on the reference clock, the timing signals from the TGs 103 and 104, and the pixel signal from the pixel unit 105, and output the generated transmission data as data in a parallel form (parallel data). Specifically, the transmission data processing circuits 106 and 107 add, to the pixel signal, data on a training sequence, which is performed in advance before effective pixel signals are transmitted, and a synchronization code, for example. The synchronization code is synchronous with a timing signal (more strictly speaking, of the timing signals, a timing signal that corresponds to the horizontal synchronizing signal HD). The transmission data processing circuits 106 and 107 correspond to a link layer of a transfer protocol, and are driven asynchronously.

P/S converters 108 to 113 each convert parallel data that is output from the corresponding one of the transmission data processing circuits 106 and 107, to data in a serial form (serial data). The serial data obtained through the conversion is supplied, by transmission drivers 116 to 121, to receiving drivers 123 to 128 (FIG. 1B) via substrates and cables. The transmission drivers 116 to 121 are connected to the receiving drivers 123 to 128 via communication lines or the like.

PLLs 114 and 115 multiply the reference clock frequency from the oscillator 101, and generate respective serial clocks of a predetermined frequency. The PLLs 114 and 115 supply, to the P/S converters 108 to 113, the serial clocks of frequencies that have been adjusted with respect to respective conversion rates for conversion to serial data performed by the P/S converters 108 to 113. The serial clocks supplied to the P/S converters 108 to 110 and the serial clock supplied to the P/S converters 111 to 113 have the same frequency, but are not in a synchronous relationship due to being output from different PLLs.

FIG. 1A shows an example in which each of the transmission data processing circuits 106 and 107 outputs three sets of parallel data. In the following description, a path for processing a plurality of sets of parallel data transmitted from the transmission data processing circuit 106 will be called a link-A processing path, and a path for processing a plurality of sets of parallel data transmitted from the transmission data processing circuit 107 will be called a link-B processing path. Each of the paths that correspond to a corresponding one of the plurality of sets of parallel data will be called a "lane". Since the link-A processing path and the link-B processing path operate asynchronously, a skew may occur in data to be processed, depending on the timing of receiving or delivering the timing signals. This skew will be called an inter-link skew. Furthermore, between the processing paths in each of the link A and the link B as well, a skew may occur due to a difference in the timing of releasing reset of the P/S converters, or due to a difference in a propagation delay time caused by a difference in the interconnect length of the transmission paths from the transmission drivers to the receiving drivers. This skew will be called an intra-link skew. The inter-link skew results from the horizontal synchronizing signal HD distributed from the TG 102 being asynchronously handled between the link-A processing path and the link-B processing path. As for the inter-link skew, the amount of skew changes between horizontal synchronization periods, and is not constant. On the other hand, as for the intra-link skew, factors responsible for skewing do not dynamically change, and accordingly the amount of skew does not change and is constant.

A configuration of the transmission data processing circuit 106 will be described with reference to FIG. 2. The configuration of the transmission data processing circuit 107 is the same as the configuration of the transmission data processing circuit 106. In FIG. 2, a counter 201 counts processing cycles in accordance with the reference clock. An FSM 202 (state machine circuit) outputs a switching instruction signal so that the output of output selectors 206 to 208 is data that conforms to a predetermined protocol, in accordance with a count value from the counter 201 and the timing signals from the TG 103. Specifically, the transmission data processing circuit 106 outputs training sequence data that is output by a training sequence generation unit 204, to the beginning of data for a predetermined time.

The training sequence data includes a predetermined, specific control code, and is used in an operation to correct (cancel) a later-described intra-link skew. A training sequence is executed in a period from when the power of the image capturing apparatus 1001 turns on until the sensor 100 transmits image data for the first time, for example. In this embodiment, the training sequence is not performed after the training sequence has been performed once, until the power of constituent elements (such as the P/S converters 108 to 113) that may cause the intra-link skew turns off. Note that, in the case of employing a configuration in which the driving frequency for the sensor 100 can be changed from the outside, a configuration may also be employed in which the training sequence is executed in a period from when the driving frequency for the sensor 100 is changed until image data is transmitted for the first time.

A synchronization code generation unit 203 adds the synchronization code that is synchronized with a timing signal (more strictly speaking, of the timing signals, a timing signal that corresponds to the horizontal synchronizing signal HD), with respect to each horizontal line of the pixel signals. The synchronization code means a specific pattern of data (symbols) having a predetermined symbol length. For example, assuming that the synchronization code is constituted by four symbols, the synchronization code is a data array such as {synchronization code 1, synchronization code 2, synchronization code 3, synchronization code 4}={0x00, 0x00, 0xFF, 0xFF}. The receiving side detects this data pattern by means of pattern matching, and can thus detect the synchronization code and the phase thereof.

An IDLE code generation unit 205 generates and outputs an IDLE code that indicates an invalid data period when there is no data to transmit.

Here, reference is made again to FIG. 1B. The S/P converters 129 to 134 acquire serial data from the receiving drivers 123 to 128, respectively, and store the acquired serial data in an internal shift register. The S/P converters 129 to 134 detect specific data in the data of the predetermined symbol length from the stored serial data, and output the detected specific data in the form of parallel data units of the predetermined symbol length, in accordance with the detection timing. Furthermore, the S/P converters 129 to 134 restore, from the serial data, a clock for receiving data. The S/P converters 129 to 134 also divide the frequency of the restored clock so as to match the symbol length of the parallel data, and also output this frequency-divided clock.

A clock change circuit 141 is constituted as a FIFO to which a write clock and a read clock are separately input, for example. The clock change circuit 141 uses a clock that is output from each of the S/P converters 129 to 134 as a write clock. The clock change circuit 141 selects one of the clocks that are output from the S/P converters 129 to 134 and uses the selected clock as a read clock. The parallel data that is output from the S/P converters 129 to 134 is output to downstream circuits at a timing that is synchronous with the aforementioned selected clock. The downstream circuits operate synchronously with the read clock that has been selected by the clock change circuit 141. Note that the read clock for the clock change circuit 141 is not limited to the example described here. In other examples, a clock obtained by multiplying a clock from an external oscillator so that the frequency thereof is the same as the frequency of a parallel clock output from each S/P converter may be input as a read clock to the clock change circuit 141.

The intra-link skew correction circuits 135 and 136 correct an intra-link skew in the input parallel data on the corresponding three lanes, and output the post-correction data to data processing circuits 137 and 138, respectively. A configuration of the intra-link skew correction circuit 135 will be described with reference to FIG. 3. The configuration of the intra-link skew correction circuit 136 is the same as the configuration of the intra-link skew correction circuit 135.

In FIG. 3, parallel data input by a buffer control unit-1 301 is sequentially stored in a buffer-0 303, a buffer-1 304, ... in this order in accordance with a counter 302, which operates based on a clock. Simultaneously, a control code detection unit 307 detects a predetermined, specific control code from the parallel data, and notifies a read pointer generation unit 330 of this detection. A buffer control unit-2 311 and a buffer control unit-3 321 have the same configuration as that of the buffer control unit-1 301, and a description thereof is thus omitted.

Note that, in the case where the control code is defined as a plurality of symbols (symbol group) having a predetermined pattern, error resistance can be provided with respect to the cases where, for example, a bit error occurs and the control code is partially corrupted as a result of performing determination using a threshold value. In this case, the control code detection unit 307 determines that the control code has been detected if the control code detection unit 307 has detected, from the parallel data, a symbol group in which the number of symbols that coincide with the control code pattern is greater than or equal to a threshold value. A specific circuit configuration for realizing this may be, for example, the same circuit configuration as one that is used when an intra-lane synchronization code detection unit 501, which will be described later with reference to FIGS. 6 and 7, detects the synchronization code.

The read pointer generation unit 330 calculates a phase difference between the buffer control units based on the timing of receiving the control code detection results from the respective buffer control units, and the timing at which the control code detection results from all of the buffer control units become available. The read pointer generation unit 330 then notifies the buffer control units of read pointers for the buffers, based on the calculated phase difference.

FIG. 11 shows an example of operations of the intra-link skew correction circuits 135 and 136. The read pointer generation unit 330 waits to be notified, by the buffer control units, of the control code detection results and starts to increment an internal read pointer upon a control code detection result being output from any of the buffer control units. FIG. 11 shows an example in which the internal read pointer starts to be incremented based on a control code detection result 1 from the buffer control unit-1 301. An offset between buffer control units can be determined based on this internal read pointer and the timing of notification of the control code detection result. In FIG. 11, the internal read pointer has proceeded to 1 at the timing of notification of a control code detection result 2, and accordingly, the offset of the buffer control unit-2 311 is 1. The internal read pointer has proceeded to 2 at the timing of notification of a control code detection result 3, and accordingly, the offset of the buffer control unit-3 321 is 2.

Upon detecting that the control code detection results having been output from all buffer control units, the read pointer generation unit 330 notifies each buffer control unit of a read pointer, which is a value obtained by adding an offset for removing an intra-link skew to the internal read pointer. As a result of each buffer control unit reading data from the buffers in accordance with this read pointer, a state where the intra-link skew has been removed is achieved. In the training sequence, valid data is not transmitted but invalid data is transmitted immediately before the control code. For this reason, even if each buffer control unit thus selects a buffer in accordance with the read pointer, there will not be a situation where valid data is skipped and is not output.

FIG. 4 is a conceptual diagram depicting input and output of the intra-link skew correction circuits 135 and 136. Data 401 to 406 is data that is input from paths (lanes) that correspond to the receiving drivers 123 to 128, respectively. Each of the sets of data 401 to 406 is constituted by the training sequence data, the synchronization code that indicates the beginning of the corresponding horizontal line, the pixel signal, and data (IDLE code) that indicates an invalid period. The training sequence data includes the predetermined, specific control code. The intra-link skew correction circuits 135 and 136 detect this control code from each lane, and correct an intra-link skew based on the detection timing. Sets of data 407 to 412 are sets of output data that correspond to the sets of data 401 to 406, respectively.

As mentioned above, as for the intra-link skew, the factor responsible for skewing does not dynamically change, and accordingly the amount of skew does not change and is constant. For this reason, a phase difference within the links does not occur after the intra-link skew has been corrected in the training sequence.

On the other hand, at this point, only the intra-link skew within the links have been corrected, and an inter-link skew still remains. To correct the inter-link skew, a configuration is also conceivable in which the same configuration as that of the intra-link skew correction circuits 135 and 136 is applied to all lanes in the link-A processing path and the link-B processing path to collectively correct skews on all lanes.

However, as for the inter-link skew, the amount of screw dynamically changes between horizontal synchronization periods, as mentioned above. For this reason, even if a skew has been corrected at the beginning of the data as per the control code during the training sequence, skewing may occur thereafter in data in each horizontal synchronization period. For this reason, in this embodiment, only an intra-link skew in each of the link-A processing path and the link-B processing path is corrected.

Note that, in the example in FIG. 4, the training sequence data is added in front of the pixel signal. That is to say, the transmission data processing circuits 106 and 107 use the timing of outputting the synchronization code and the pixel signal for the first time after constituent elements (such as the P/S, converters 108 to 113) that may cause an intra-link skew are activated. At this timing, the transmission data processing circuits 106 and 107 output the training sequence data (first data) prior to outputting the synchronization code and the pixel signal (second data). However, the training sequence data may also be solely transmitted at a different timing, independent of the pixel signal. For example, the transmission data processing circuits 106 and 107 generate only the training sequence data and output the generated data in the form of parallel data at a timing at which constituent elements (such as the P/S converters 108 to 113) that may cause an intra-link skew are activated. The intra-link skew correction circuits 135 and 136 receive the training sequence data via the receiving drivers 123 to 128 and so on, and determine the offset of each buffer control unit (see FIG. 3). Thereafter, upon the pixel unit 105 outputting the pixel signal, the intra-link skew correction circuits 135 and 136 add the synchronization code (and the IDLE code if necessary) to the pixel signal, and output this pixel signal in the form of parallel data. Upon acquiring this parallel data, the intra-link skew correction circuits 135 and 136 correct an intra-link skew based on the offset that has been determined in advance.

Returning to FIG. 1B, the data processing circuits 137 and 138 detect the synchronization code that is included in the input data, and output a synchronization code detection signal that indicates that the synchronization code has been detected. The configuration of the data processing circuit 137 will be described with reference to FIG. 5. The configuration of the data processing circuit 138 is the same as the configuration of the data processing circuit 137.

Figure 5:
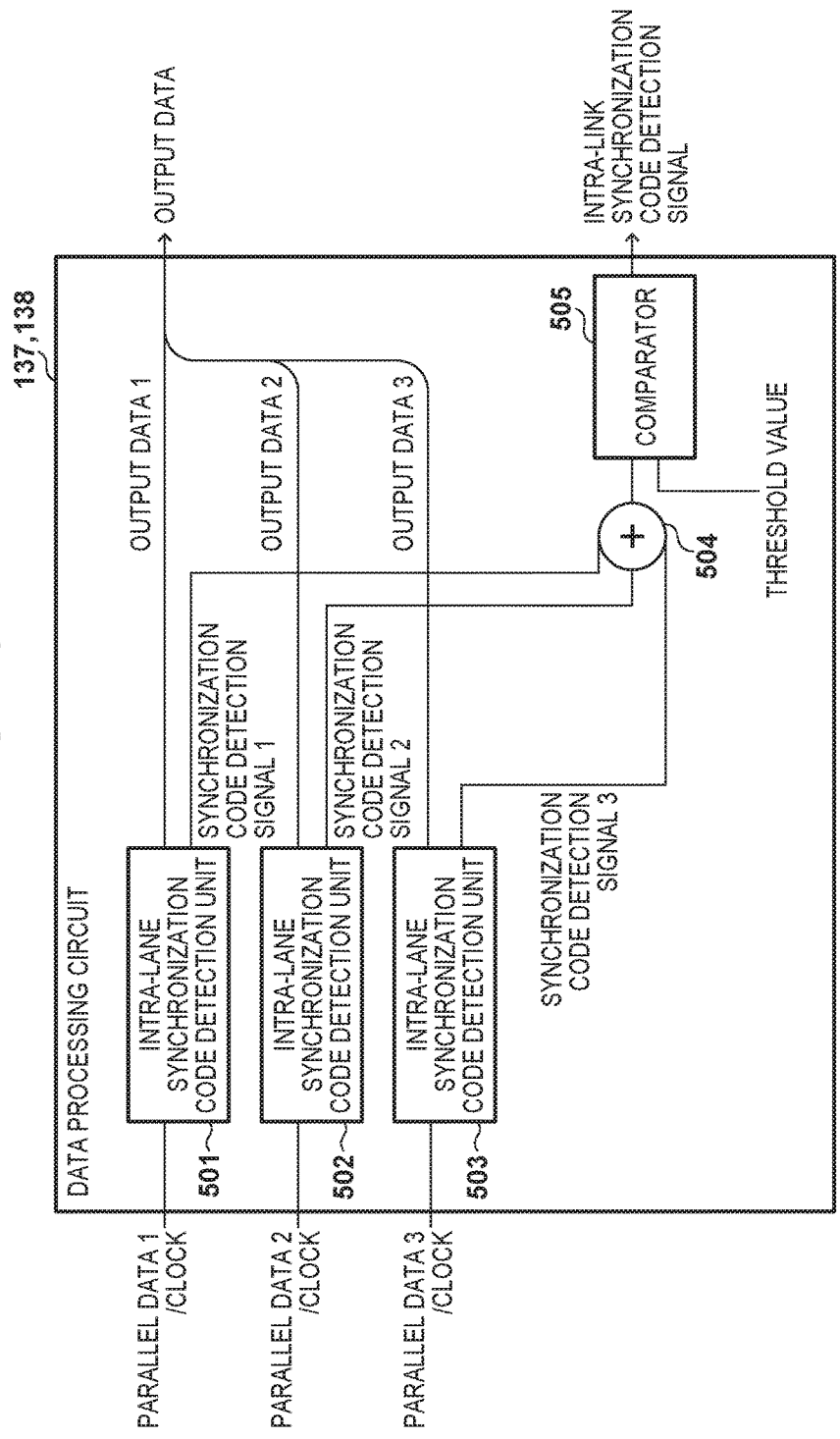
FIG. 5 is a block diagram showing a configuration of data processing circuits 137 and 138.

In FIG. 5, the intra-lane synchronization code detection units 501 to 503 detect the synchronization code in each lane within the link. An adder 504 adds synchronization code detection signals from the respective intra-lane synchronization code detection units. A comparator 505 compares the addition result with a preset threshold value, and outputs an intra-link synchronization code detection signal if the addition result is greater than or equal to the threshold value. For example, it is assumed that the synchronization code detection signals were output from the intra-lane synchronization code detection units 501 and 502, and the synchronization code detection signal was not output from the intra-lane synchronization code detection unit 503 due to a factor such as a bit error. In this case, assuming that the threshold value is 2, two synchronization code detection signals have been output, and accordingly, the comparator 505 outputs an intra-link synchronization code detection signal.

Data of respective samples output from the intra-lane synchronization code detection units 501 to 503 are bundled into one set, which is output as output data. Here, sets of parallel data 1 to 3 that are input to the intra-lace synchronization code detection units 501 to 503 have already been synchronized. For this reason, for example, if the data input to each of the intra-lane synchronization code detection units 501 to 503 is n bits per sample, the sets of data of the respective samples output from the intra-lane synchronization code detection units 501 to 503 are bundled into one set, which is output as 3n-bit data.

By thus collectively evaluating the synchronization code detection results for multiple lanes, error resistance can be provided with respect to cases where, for example, a bit error has occurred on a specific lane and the synchronization code cannot be detected from this lane.

The configuration of the intra-lane synchronization code detection unit 501 will be described with reference to FIG. 6. The configuration of the intra-lane synchronization code detection units 502 and 503 is the same as the configuration of the intra-lane synchronization code detection unit 501. Here, an example in which the synchronization code is constituted by four symbols is described.

Figure 6:
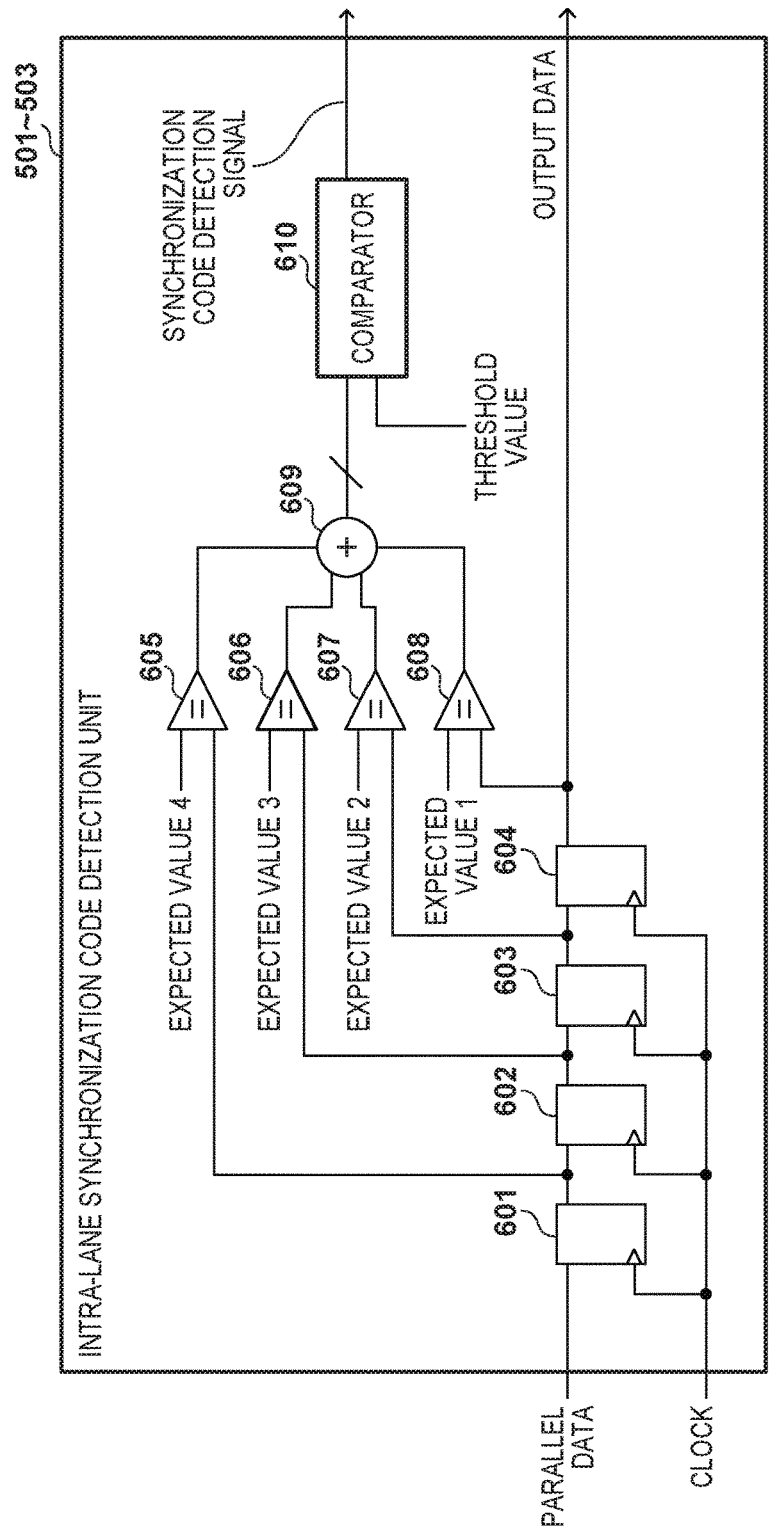
FIG. 6 is a block diagram showing a configuration of intra-lane synchronization code detection units 501 to 503.

In FIG. 6, delay elements 601 to 604 delay input parallel data. Comparators 605 to 608 compare the output of the delay elements 601 to 604, respectively, with an expected value of each symbol in the four-symbol synchronization code. The comparators output 1 if the output of the delay elements 601 to 604 coincides with the expected value, and output 0 if the output does not coincide therewith. An adder 609 adds the output from the comparators. A comparator 610 compares the addition result with a preset threshold value, and outputs the synchronization code detection signal if the addition result is greater than or equal to the threshold value.

Figure 7:
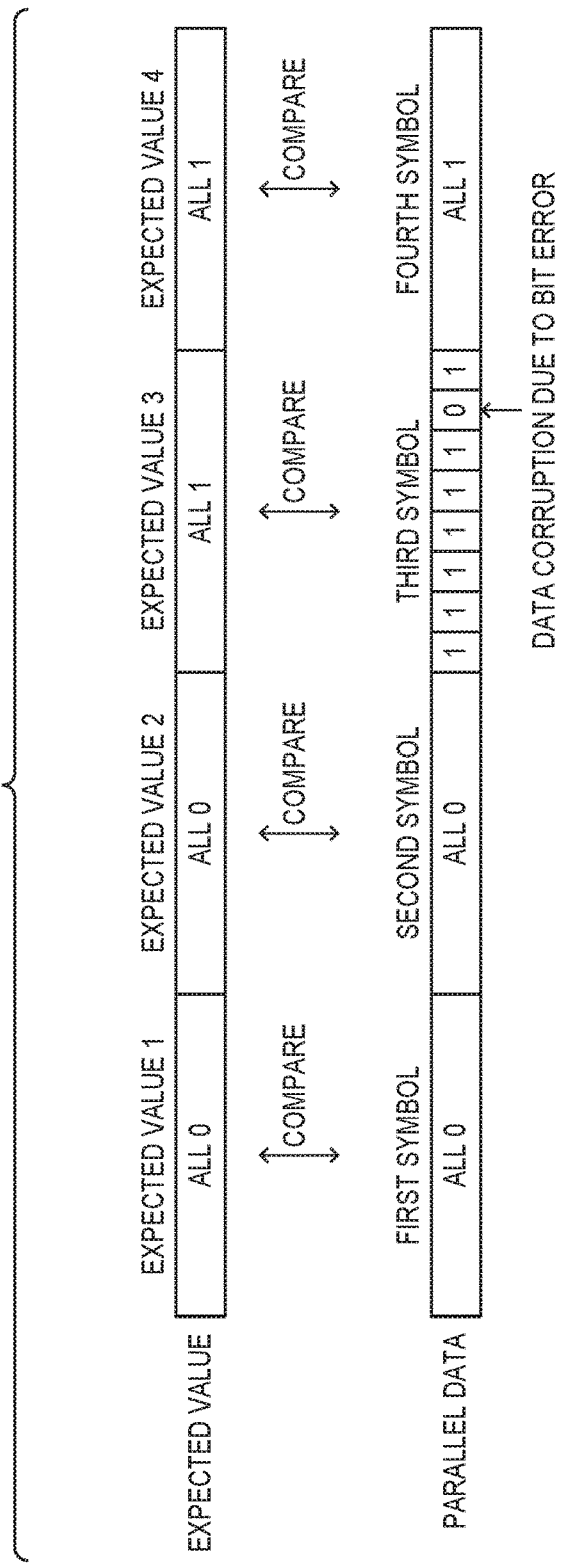
FIG. 7 is a conceptual diagram showing symbols of parallel data that are input to the intra-lane synchronization code detection units 501 to 503, and symbols of expected values of the synchronization code.

FIG. 7 is a conceptual diagram showing symbols in parallel data that is input to the intra-lane synchronization code detection units 501 to 503, and symbols of expected values of the synchronization code. In the example in FIG. 7, a first symbol, a second symbol, and a fourth symbol in the parallel data coincide with an expected value 1, an expected value 2, and an expected value 4, respectively. Data of a third symbol in the parallel data is corrupted due to a bit error, and the third symbol takes a value different from an expected value 3, which is ALL 1. In this case, assuming that the threshold value is 3, there are three input symbols that coincide with the respective expected values, and accordingly, the intra-lane synchronization code detection unit 501 outputs the synchronization code detection value.

Thus, the synchronization code is defined as a plurality of symbols (symbol group) having a predetermined pattern, and the intra-lane synchronization code detection unit 501 collectively evaluates the results of comparison between the respective symbols and the expected values thereof. That is to say, the intra-lane synchronization code detection unit 501 determines that the synchronization code has been detected if a symbol group in which the number of symbols that coincide with the synchronization code pattern is greater than or equal to the threshold value is detected from the parallel data. Thus, error resistance can be provided with respect to cases where a bit error has occurred in a certain cycle and the synchronization code is partially corrupted.

Returning to FIG. 1B, the inter-link skew correction circuit 139 receives parallel data A that is output from the data processing circuit 137 and an intra-link synchronization code detection signal A, as well as parallel data B that is output from the data processing circuit 138 and an intra-link synchronization code detection signal B. The inter-link skew correction circuit 139 then corrects an inter-link skew associated with parallel data A and B, based on the intra-link synchronization code detection signals A and B.

Figure 8:
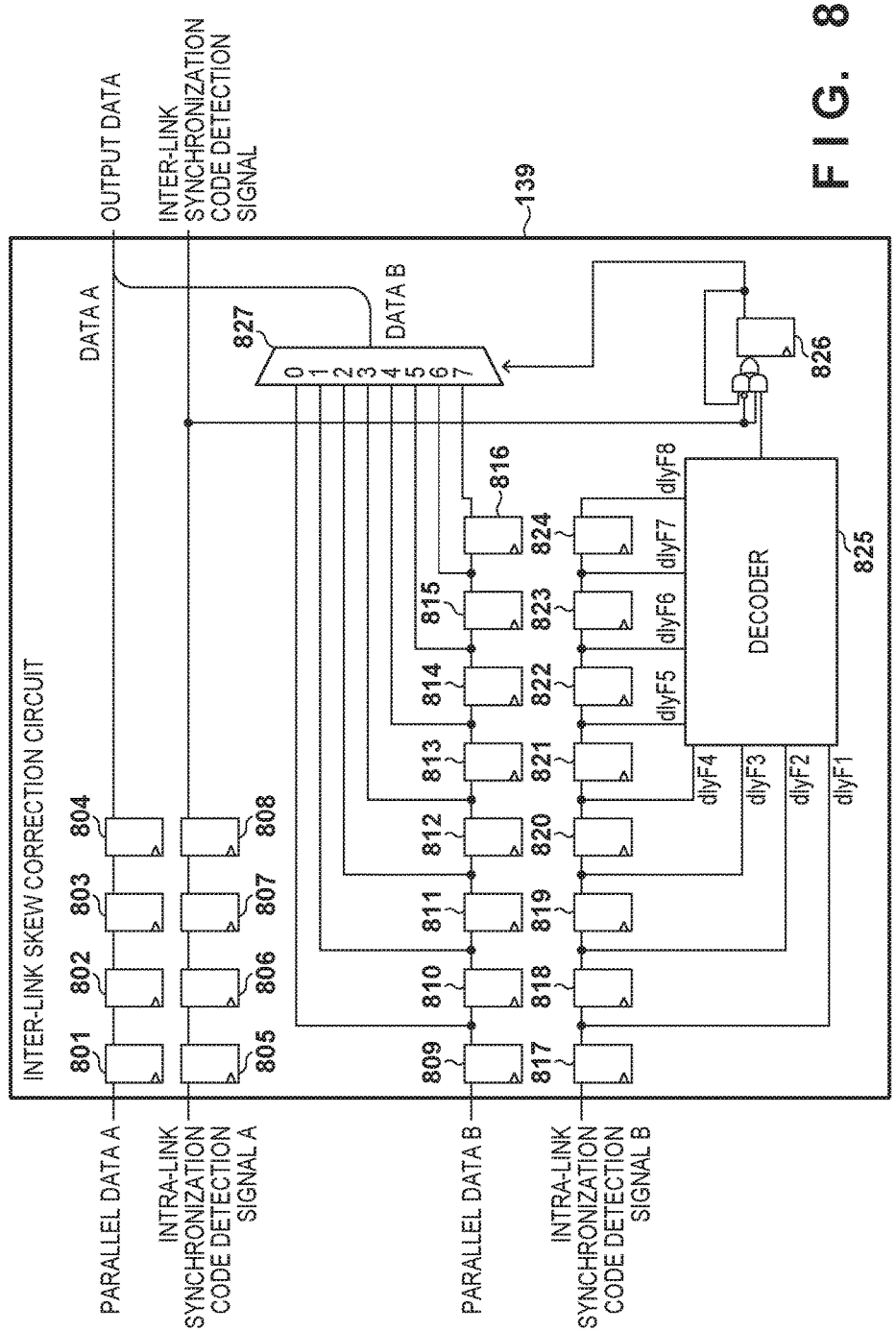
FIG. 8 is a block diagram showing a configuration of an inter-link skew correction circuit 139.

A configuration of the inter-link skew correction circuit 139 will be described with reference to FIG. 8. In FIG. 8, delay elements 801 to 804 delay the parallel data A. Delay elements 805 to 808 delay the intra-link synchronization code detection signal A. Delay elements 809 to 816 delay the parallel data B. Delay elements 817 to 824 delay the intra-link synchronization code detection signal B. Each of these delay elements is constituted by a flip-flop, and shifts input data rightward (to the output direction) synchronously with a parallel clock.

A decoder 825 acquires and decodes respective outputs dlyF1 to dlyF8 of the delay elements 817 to 824. A loadable DFF 826 (D-type flip-flop) latches the output of the decoder 825 when the output of the delay element 808 switches to high level. A selector 827 selects any of the outputs from the delay elements 809 to 816 in accordance with decode data that is output from the loadable DFF 826. Thus, data B that is output from the selector 827 and data A that is output from the delay element 804 are combined to form output data, and the output of the delay element 808 serves as the output of the inter-link synchronization code detection signal.

Figure 9:
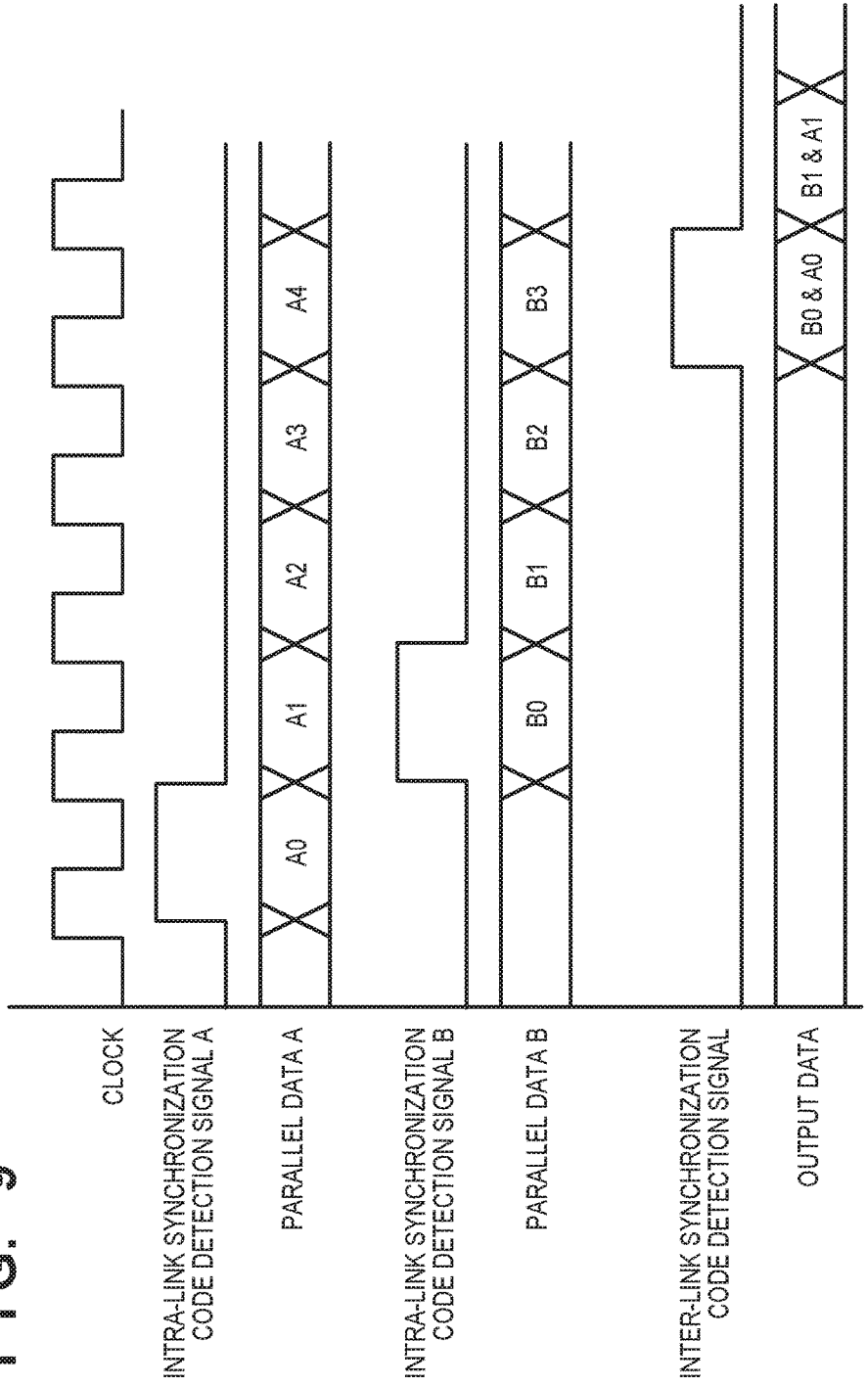
FIG. 9 is a conceptual diagram depicting input and output of the inter-link skew correction circuit 139.

FIG. 9 is a conceptual diagram depicting input and output of the inter-link skew correction circuit 139. There is a skew corresponding to one clock cycle between the parallel data A and the parallel data B. A decoding condition of the decoder 825 is to select, using the selector 827, the output of any one of the delay elements 809 to 816 that hold the parallel data B that is input at the same time as the timing at which the intra-link synchronization code detection signal B is valid. (i.e. "1"). The output of the decoder 825 is latched when the output of the delay element 808 switches to high level, and as a result, a signal of the parallel data A that is delayed for four cycles and a signal of the parallel data B that is delayed for three cycles are output in an aligned manner.

As described above, according to the first embodiment, the amount of intra-link skew does not change after constituent elements (such as the P/S converters 108 to 113) that may cause this intra-link skew are activated. As for the inter-link skew, the amount of skew changes between horizontal synchronization periods. In such a situation, the image capturing apparatus 1001 specifies the amount of intra-link skew (offset of each buffer control unit in FIG. 3) based on the control code, before transferring the pixel signal for the first time. When transferring the pixel signal, the image capturing apparatus 1001 corrects an inter-link skew after correcting an intra-link skew. As a result, a shift in the timing between data transmitted through a plurality of paths can be efficiently corrected.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment ((s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical dish (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-222666, filed Nov. 15, 2016 which is hereby incorporated by reference herein in its entirety.

What is claimed is:

1. An image capturing apparatus comprising:
   a sensor comprising:
      a pixel unit configured to be driven based on a reference timing signal, and output a pixel signal;
      a first output unit configured to output, via a plurality of transmission paths in accordance with a first timing signal that is associated with the reference timing signal, a plurality of sets of first data obtained by adding, synchronously with the first timing signal, a synchronization code to the pixel signal output from the pixel unit; and
      a second output unit configured to output, via a plurality of transmission paths in accordance with a second timing signal that is associated with the reference timing signal, a plurality of sets of second data obtained by adding, synchronously with the second timing signal, the synchronization code to the pixel signal output from the pixel unit; and
   an image processing unit comprising:
      a first correction unit configured to correct a shift in timing between the plurality of sets of first data output from the first output unit;
      a second correction unit configured to correct a shift in timing between the plurality of sets of second data output from the second output unit; and
      a third correction unit configured to correct a shift in timing between the plurality of sets of first data that have been corrected by the first correction unit and the plurality of sets of second data that have been corrected by the second correction unit, based on the synchronization code.

2. The image capturing apparatus according to claim 1, wherein the first output unit and the second output unit output data including a control code before outputting the plurality of sets of first data and the plurality of sets of second data,
   the first correction unit corrects the shift in the timing between the plurality of sets of first data based on a timing at which the control code is detected, and
   the second correction unit corrects the shift in the timing between the plurality of sets of second data based on a timing at which the control code is detected.

3. The image capturing apparatus according to claim 1, wherein the third correction unit corrects a shift between a timing at which the synchronization code is detected in sets of data, the number of which is greater than or equal to a first threshold value, in the plurality of sets of first data that have been corrected by the first correction unit, and a timing at which the synchronization code is detected in sets of data, the number of which is greater than or equal to the first threshold value, in the plurality of sets of second data that have been corrected by the second correction unit.

4. The image capturing apparatus according to claim 1, wherein the synchronization code is a symbol group having a first pattern, and
   the third correction unit determines that the synchronization code has been detected in the plurality of sets of first data if a symbol group in which the number of symbols that coincide with the first pattern is greater than or equal to a second threshold value is detected in each of the plurality of sets of first data that have been corrected by the first correction unit.

5. The image capturing apparatus according to claim 2, wherein the control code is a symbol group having a second pattern, and
   the first correction unit determines that the control code has been detected if a symbol group in which the number of symbols that coincide with the second pattern is greater than or equal to a third threshold value is detected in each of the plurality of sets of first data output by the first output unit.

6. The image capturing apparatus according to claim 2, wherein the control code is a symbol group having a second pattern, and
   the second correction unit determines that the control code has been detected if a symbol group in which the number of symbols that coincide with the second pattern is greater than or equal to a third threshold value is detected in each of the plurality of sets of second data output by the second output unit.

7. The image capturing apparatus according to claim 1, further comprising:
   an oscillator unit configured to generate a clock;
   a synchronizing signal generation unit configured to generate a horizontal synchronizing signal and a vertical synchronizing signal based on the clock;
   a reference timing generation unit configured to generate the reference timing signal based on the clock, the horizontal synchronizing signal, and the vertical synchronizing signal;
   a first timing generation unit configured to generate the first timing signal based on the clock, the horizontal synchronizing signal, and the vertical synchronizing signal; and
   a second timing generation unit configured to generate the second timing signal based on the clock, the horizontal synchronizing signal, and the vertical synchronizing signal.

8. The image capturing apparatus according to claim 7, wherein the synchronization code is synchronized with the horizontal synchronizing signal.

9. The image capturing apparatus according to claim 1, wherein the first output unit comprises a plurality of first conversion units configured to convert the plurality of sets of first data that are in a parallel form to a serial form, and output the plurality of sets of first data that have been converted to a serial form, in accordance with the first timing signal,
   the second output unit comprises a plurality of second conversion units configured to convert the plurality of sets of second data that are in a parallel form to a serial form, and output the plurality of sets of second data that have been converted to a serial form, in accordance with the second timing signal,
   the image processing unit comprises:
      a plurality of first inversion units configured to convert, to a parallel form, the plurality of sets of first data that are input in a serial form, and output the plurality of sets of first data that have been converted to a parallel form; and a plurality of second inversion units configured to convert, to a parallel form, the plurality of sets of second data that are input in a serial form, and output the plurality of sets of second data that have been converted to a parallel form, and the first correction unit corrects a shift in timing between the plurality of sets of first data that have been converted by the plurality of first inversion units, and the second correction unit corrects a shift in timing between the plurality of sets of second data that have been converted by the plurality of second inversion units.

10. The image capturing apparatus according to claim 2, wherein the first output unit and the second output unit output data including the control code after the image capturing apparatus has been started, and before the pixel unit outputs the pixel signal.

11. The image capturing apparatus according to claim 1, wherein the image processing unit is provided in a chip that is different from a chip in which the sensor is provided.

* * * * *